United States Patent

[11] 3,550,965

| [72] | Inventors | Walter J. Reinecker<br>1231 Martine Ave., Plainfield, N.J. 07060;<br>David J. Westergard, Kent Fort Manor,<br>Stevensville, Md. 21666 |
|---|---|---|
| [21] | Appl. No. | 807,822 |
| [22] | Filed | Mar. 17, 1969 |
| [45] | Patented | Dec. 29, 1970 |

[54] MULCHING MACHINE
8 Claims, 4 Drawing Figs.

[52] U.S. Cl. .................................................. 302/37, 302/36
[51] Int. Cl. ...................................................... B65g 53/40
[50] Field of Search .......................................... 302/37, 36, 17; 222/228; 47/9

[56] References Cited
UNITED STATES PATENTS

| 2,952,492 | 9/1960 | Finn .............................. | 302/36 |
| 3,015,188 | 1/1962 | Reinecker et al............. | 47/9 |

*Primary Examiner*—Andres H. Nielsen
*Attorney*—Charles H. Recht

ABSTRACT: A machine is disclosed for spreading mulch material over seeded ground areas. The machine receives opened bales of mulch material, beats and flails the material in a beater chamber and, by means of a blower, forces the shredded material through a discharge spout and out onto the ground area to be covered.

INVENTORS: WALTER J. REINECKER
DAVID J. WESTERGARD
ATTORNEY

INVENTORS: WALTER J. REINECKER
DAVID J. WESTERGARD
BY
ATTORNEY

MULCHING MACHINE

BACKGROUND OF THE INVENTION

This invention relates to a device, such as a mulching machine, for spreading, diffusing or distributing mulch material such as straw, hay, bark and the like over the ground.

During the course of building highways, housing projects, golf courses, and other large construction projects, vast areas of ground are stripped of vegetation and left exposed. Upon the completion of the construction and in order to beautify the area, the denuded land areas are seeded or covered with plant material and then covered with a layer of mulch to promote germination, prevent erosion and to protect the seedling or plant as it first emerges. In order that the cost of the planting and mulching may be held to a minimum, these operations are normally performed by machines specially designed for this purpose.

With particular reference to the spreading of the mulch material, this operation is performed by specially designed machines in which opened bales of mulch material, such as hay, straw and the like, are fed down a chute and into a beater chamber where the mulch material is beaten and flailed. From there, the mulch is drawn by a fan and blown out of an adjustable spout that is manually aimed and, by means of which the mulch is spread over the area that is to be covered.

The presently available machines for performing this function have a number of limitations which render them less than ideal. One of these is that the beating or flailing apparatus is not 100 percent efficient and as a result, under certain conditions, the mulch is not completely shredded and is ejected in clumps rather than as a uniform stream of shredded material. Another deficiency of the presently available machines is that they are large in size and are designed to be pulled or towed by large trucks or tractors. They are therefore unsuitable for covering medium sized areas, i.e., large yards, etc. with mulch.

BRIEF SUMMARY OF THE INVENTION

It is therefore an object of our invention to provide a mulcher having a more efficient mixing or beating chamber so that the number of clods and clumps of ejected mulch material is minimized.

Another object is to provide a mulcher that may be mounted on small trucks and may be economically used to cover medium sized areas.

In accordance with our invention, we provide a mulcher having a beating, mixing or flailing chamber that is configured, shaped, and proportioned to thoroughly mix and break up the mulch material so that no clods or clumps appear in the output stream. Most mulchers use a mixing chamber that is circular in cross section, thus permitting the partially broken mulch to travel in a circular path in the mixing chamber and to develop a centrifugal force that keeps the mulch material along the inner wall of the circular chamber and away from the influence of the flailing members which are affixed to a shaft extending horizontally through the chamber. With chambers of this design, much of the material may travel in a circumferential helical path while being drawn to the blower. As a result, this material is not thoroughly shredded and may contain clods when ejected from the machine.

As distinguished from the prior art machines and in accordance with a first embodiment of our invention, we provide a beater chamber which, in cross section, is circular only in part with the remainder being configured so that, on every revolution of its circular travel in the chamber, the mulch is repeatedly forced back to the center of the chamber where it is thoroughly shredded by the flailing chains. As a result, the ejected mulch is free from clods and clumps.

A second embodiment of our invention utilizes a beater chamber of circular cross section to efficiently shred the mulch.

Our invention is further advantageous in that it may be embodied in a relatively small machine that may be mounted on a truck for the economical covering of small and medium sized areas with mulch.

DETAILED DESCRIPTION

These and other objects and advantages will become more apparent from a reading of the following description of an illustrative embodiment of our invention taken in conjunction with the drawing in which.

Figure 1:
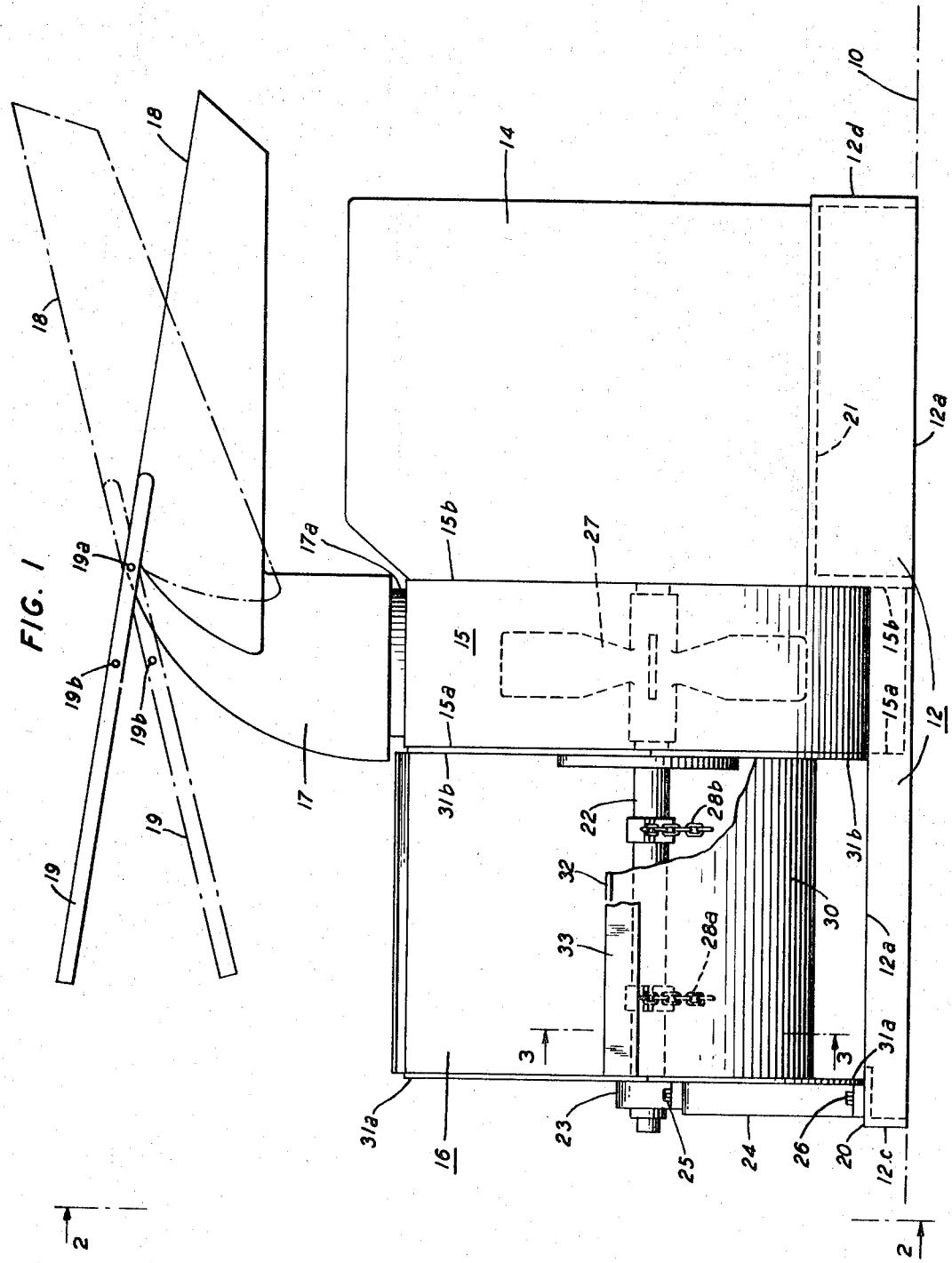
FIG. 1 shows a side view of a mulcher embodying our invention in accordance with a first preferred embodiment.

As shown in the various drawing figures, our invention is shown embodied in a machine that may be mounted upon the back of a small truck or the like 10. The machine comprises a base 12, a suitable engine 14, a fan housing 15, a flailing chamber 16, and an exit passage 17 having an adjustable spout 18 for the controllable ejection and spreading of the mulch material.

Figure 2:
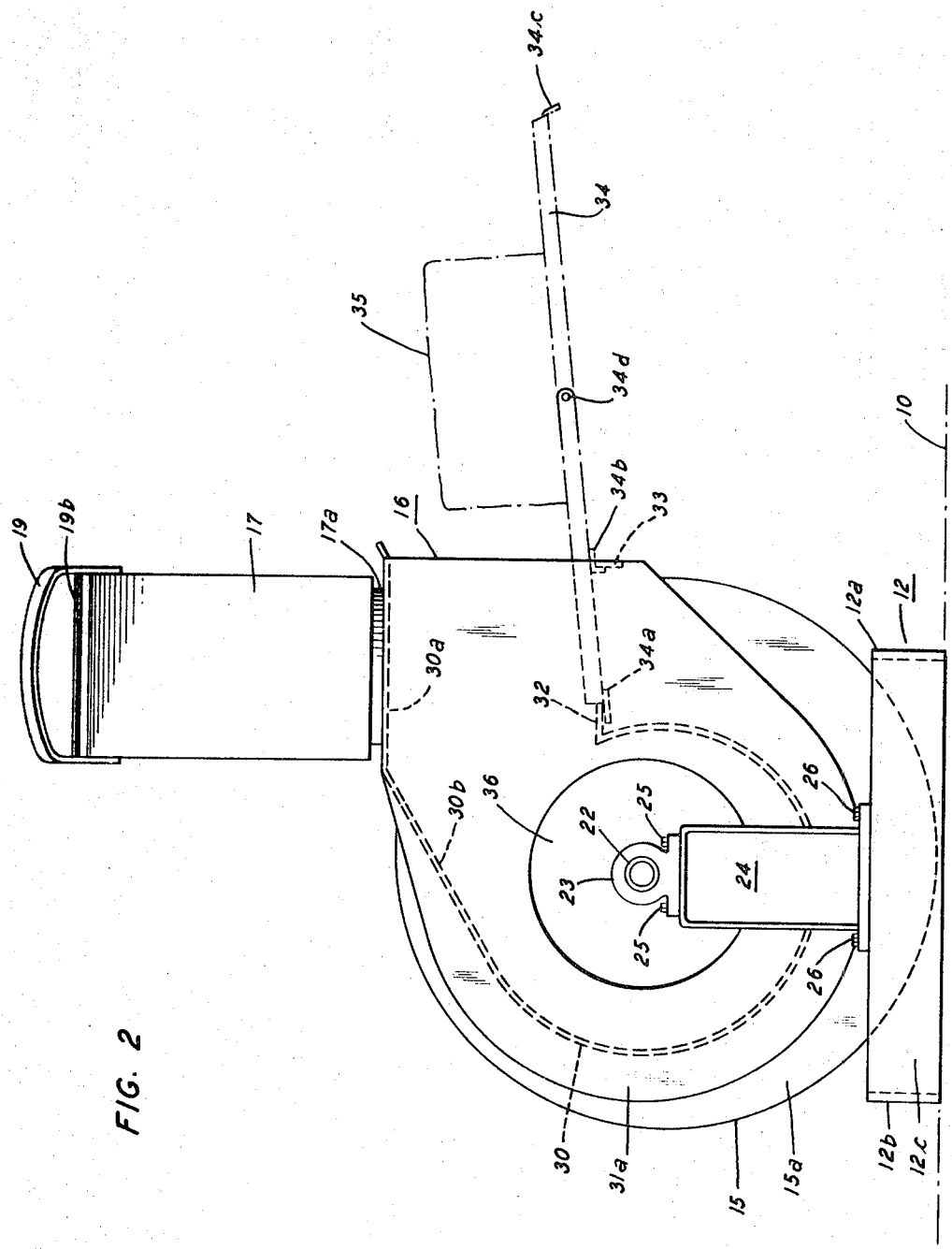
FIG. 2 is an end view taken along line 2–2 of FIG. 1.

The base 12 comprises four steel members 12a, 12b, 12c and 12d welded together at their ends to form an open rectangle when viewed from the bottom. These four members comprise the front and rear members, 12a and 12b, together with the two side members 12c and 12d as shown in FIGS. 1 and 2. A horizontal shelf member 20 is welded to the top of the left side member 12c as well as to the top of the front, 12a, and rear, 12b, members of the base as shown in FIG. 1. Shelf 20 provides a suitable mounting base for other elements of our mulcher as subsequently described. Also, a horizontal shelf 21 extends along the top and on the right side of the base from the front to the rear members and is welded thereto as well as to the right-hand base member 12d. The shelf 21 provides a suitable mounting base for the engine 14 which is shown only diagrammatically since its details comprise no portion of our invention. The output shaft (not shown) of the motor or engine is connected to the right end of the horizontal shaft 22 shown in FIG. 1 which extends from the motor, through the blower housing 15, through the beating chamber 16, to the bearing 23 with the left end of the shaft being retained by the bearing. The bearing, in turn, is affixed by means of bolts 25 to a bearing housing 24 which, in turn, is fixably attached by means of screws or bolts 26 to the shelf 20 welded to the left end, 12c, of the base 12 as best shown on FIG. 1. A fan or blower 27 is fixably attached to the shaft 22 in the blower housing; in the beating chamber the beating chains 28a and 28b are fixably attached by means of suitable collars to the shaft 22.

In the operation of our machine, the opened bales of mulch material are inserted into an opening in the side of beater chamber 16. With the shaft 22 and, in turn, the beating chains 28 and the blower 27 being rotated at the proper speed by motor 14, the mulch material is shredded by the chains, sucked into the blower housing 15 under influence of the vacuum created by the blower 27, and finally, expelled upward by the fan into the discharge elbow 17 and out of the manually adjustable spout 18. The position of the spout 18 is manually adjustable by means of U-shaped handle 19 whose right end is welded to spout 18 and which is pivoted about a shaft 19a which extends through the upper portion of elbow 17. The shaft 19b extends through both sides of the U-shaped handle and limits its downward travel.

In addition to the angular position of the spout 18 being adjustable by handle 19, the handle is also effective to rotatably adjust the chute 17 at any desired position with respect to the blower housing 15 and the remainder of the machine. The position of elbow 17 may be adjusted in this manner since it is rotatably affixed to the hollow tubular member 17a which interconnects an outlet (not shown) in the top of blower housing 15 with a circular inlet (not shown) in the lower portion of elbow 17. This provides a passage for the transfer of the shredded mulch material out of the blower housing, into the elbow 17 and out of the spout 18. The rotatable adjustment of the elbow 17 and the angular elevation adjustment of spout 18, all under control of handle 19, permits the shredded mulch material to be controllably spread over the ground in the area that is to be covered.

Figure 3:
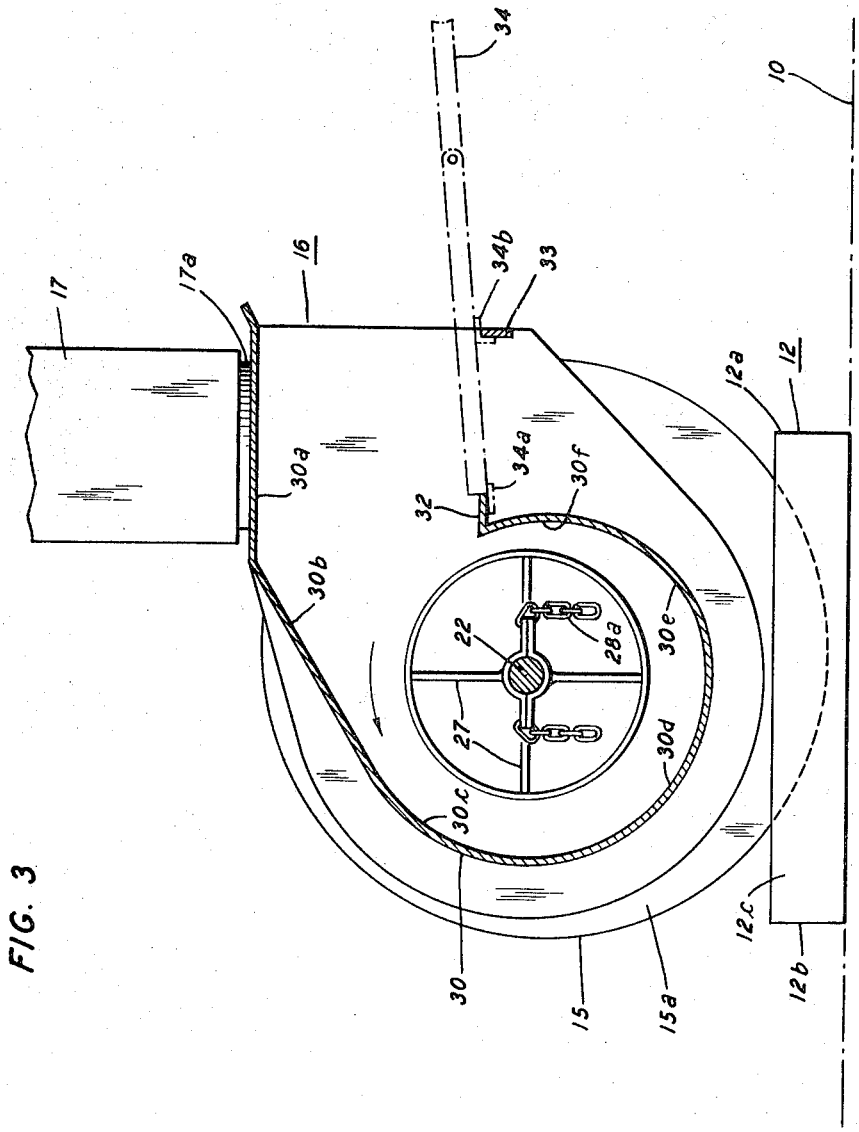
FIG. 3 is a cross section view taken along line 3–3 of FIG. 1.

With reference to FIG. 1, the beater chamber 16 comprises a left end wall member 31a, a right end wall member 31b, and a sidewall member 30, which extends between the end walls 31a and 31b, and as shown on FIG. 3, has a partially circular appearance when viewed in cross section. As best shown in detail on FIG. 3, the wall member 30 comprises a substantially flat horizontally oriented top portion 30a, a downward extending and essentially straight portion 30b, portions 30c, 30d and 30e which are configured to comprise a semicircle of a fixed diameter with respect to the shaft 22, and a semicircular portion 30f which is configured to have a decreasing radius with respect to the shaft as a path is traversed upward from portion 30e and then to and along portion 30f.

A flat horizontally positioned lip 32 is welded to the upper terminus of portion 30f of the beater chamber wall. A strip of steel 33 extends from the front of the left wall 31a to the front of the right wall 31b and is welded thereto to provide a support member 33. The lip 32 and the support member 33 provide suitable means to affix a loading tray 34 to an opening in the beater chamber. As best shown in FIG. 2, the loading tray comprises a right angle member 34b which rests on top of the support member 33, and a flat strip 34a which is welded to the bottom sides of the tray and which engages the underside of lip 32 when the tray is positioned in the manner shown in FIG. 2. The members 34a and 34b rigidly hold the loading tray to the mixing chamber. An end piece 34c (FIG. 2) provides a lip for the right end of the loading tray and facilitates the placing of a bale 35 on the tray by an operator.

As already mentioned, with respect to FIG. 2, bales of mulch material, such as for example, bale 35, are placed on loading tray 34, pushed by the operator into the side of the beater chamber where they are thoroughly shredded by the chains, drawn into the blower housing and expelled therefrom to the elbow 17 and out of spout 18 onto the ground areas to be covered. The configuration of the wall member 30 of the mixing chamber ensures that the bales of mulch material are thoroughly shredded before they may leave the mixing chamber and are drawn into the fan housing. The mixing chambers of the prior art machines are essentially circular in configuration when viewed in cross section. Without more, this circular configuration permits the mulch material to travel in a circular path under the influence of the beating chains. The velocity of the mulch material, when traveling in its circular path, increases under the influence of the chains so that as a result, the chains and the mulch material tend to travel in a circular path. Since the mulch and the chains rotate concurrently, the effectiveness of the chains as flailing or beating instrumentalities is minimized and the entire mass of mulch within the chamber merely swirls with the chains rotated by the shaft. Consequently, centrifugal action forces the mulch outward to the beater chamber wall reducing the effectiveness of the flails and considerable clods and clumps of mulch material may be drawn into the fan housing and then propelled out of the exit elbow and spout.

In contradistinction to the machines of the prior art, a swirling action of the type described above is not possible in our machine due to the new and novel configuration of the wall member of our mixing chamber. The benefits and advantages provided by the configuration of wall member 30 of our mixing chamber may be easily understood with reference to FIGS. 2 and 3. As the bale of mulch material 35 is pushed by the operator to the left beyond lip 32 and into the mixing chamber, the mulch material is struck by the rapidly rotating chains and, under their influence, begins to travel in a counterclockwise circular path. Thus, when the material first enters the chamber, it is struck by the chains and travels in a circular path past wall sections 30b, 30c, and 30d, and 30e of the mixing chamber. Next, as the material passes by wall section 30f, the radius of its circular path of rotation decreases due to the decreased radius of the most counterclockwise end of portion 30f, and finally, as the material continues its counterclockwise travel and passes beyond the upper terminus of portions 30f, it is propelled toward and strikes portion 30b of the wall. The configuration of portion 30f is such that the material strikes wall portion 30b head on and at right angles so that the counterclockwise travel of the material is immediately arrested. As a result, after the material bounces off wall portion 30b, it has none of its centrifugal velocity left and instead it falls downward toward the center of the chamber where it is once again struck by the beating chains and caused to travel once more in a counterclockwise path around the inner wall of the drum. In a similar manner, each time the material travels beyond the upper terminus of wall portion 30f, it bounces at right angles against portion 30b, is arrested in its travel, and falls once more into the center of the drum and the beating chains. The repeated bouncing of the material off wall portion 30b and back into the chain prevents the mulch material from being swirled at an angular rotation approximating that of the chains and thus enables the chains to shred fully the mulch material so that no clods or clumps are left therein by the time the material is drawn into the fan housing and propelled out onto the ground via the exit chute and spout.

Figure 4:
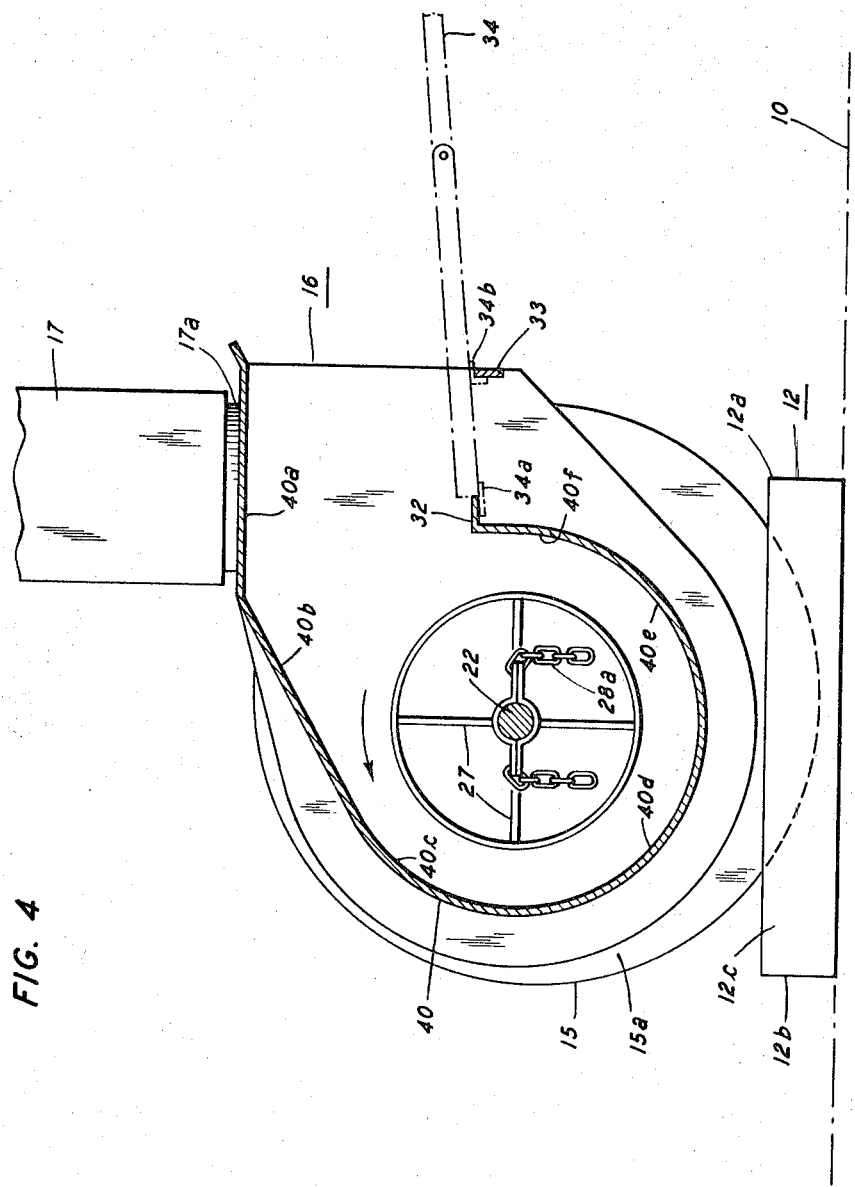
FIG. 4 is similar to FIG. 3 except that it illustrates the use of an alternative beater chamber having a circular cross section.

FIG. 4 discloses an alternative embodiment of our invention in which a beater chamber having a circular cross section is used together with material entrance opening in the right side of the chamber wall to efficiently shred the mulch in the same manner as the embodiment of FIGS. 1 through 3. The embodiment of FIG. 4 is identical to that of FIGS. 1 through 3 except for the cross-sectional shape of the beater chamber wall. All elements of FIG. 4 that are identical to the embodiment of FIGS. 1 through 3 bear identical designations, i.e., base 12, shaft 22, etc. The only difference between the two embodiments is that whereas the chamber wall and its elemental parts on FIGS. 2 and 3 are designated 30, 30a, 30b, 30c, 30d, 30e, and 30f, the corresponding wall elements on FIG. 4 are designated 40, 40a, 40b, 40c, 40d, 40e, and 40f. Also, whereas the wall elements 30a through 30e are circular in cross section and wall element 30f is of decreasing radius, all of wall elements 40a through 40f are of an essentially constant cross-sectional radius.

Whereas in FIGS. 2 and 3 the decreasing radius of element 30f directed the mulch in the desired direction toward wall element 30b, the same desired result is achieved in the embodiment of FIG. 4 where the speed and volume of air in the material intake opening effectively redirects the travel of the mulch after it leaves element 40f so that the mulch strikes element 40b at the desired angle so as to provide an efficient mulching action in the same manner as the embodiment of FIGS. 1 through 3.

The hole 36 in the left end wall 31a of the mixing chamber comprises an air intake which maximizes the efficiency of the fan and permits the fan to maintain a high velocity air travel through the mixing chamber, into the fan housing, and out of the exit elbow and spout even in instances in which an oversized bale may be blocking the entirety of the entry to the mixing chamber. If hole 36 were not provided, the fan would not be able to maintain a high velocity air stream whenever the mulch material input to the mixing chamber is blocked by the baled material. The details of the motor 14 together with certain details of the exit chute 17 and spout 18 have not been shown in complete detail in order to simplify an understanding of our invention and further, since such details are well known in the prior art and are disclosed for example in our U.S. Pat. No. 3,015,188 of Jan. 2, 1962 as well as in our copending applications Ser. No. 610,083, filed Jan. 18, 1967, now U.S. Pat. No. 3,392,923, and Ser. No. 680,512, filed Nov. 3, 1967, now U.S. Pat. No. 3,478,793.

It may be appreciated from the foregoing that the mulching machine provided in accordance with our invention is advantageous in that the design of the mixing chamber walls maximizes the efficiency of the chains in shredding the mulch material. The machine of our invention is further advantageous in that it is small in size, may be mounted on the back of a medium sized pickup truck and therefore may economically be used to cover small to medium sized land areas with mulch material.

It is to be understood that the above described arrangements are but illustrative of the application of the principles of the invention. Numerous other arrangements may be devised by those skilled in the art without departing from the spirit and scope of our invention.

We claim:

1. A mulch shredding and dispensing machine comprising:
   a horizontally oriented drum-shaped mixing chamber;
   a drive shaft extending horizontally through the longitudinal center axis of said chamber;
   means for rotating said shaft;
   an opening in the cylindrical wall of said chamber for receiving material to be shredded;
   shredding means affixed to said shaft and effective as mulch material is inserted through said opening and into said drum for causing said material to move in a semicircular path with respect to said shaft along the inner cylindrical wall surface of said drum;
   means in said chamber effective during each revolution of said material within said chamber and about said shaft for momentarily arresting the circular travel of said material in said drum;
   means for extracting shredded mulch material from said drum; and
   means for controllably spreading said shredded material over a selected ground area.

2. The invention of claim 1 wherein said means for arresting comprises:
   a first portion of the inner surface of said chamber; and
   means comprising a second portion of the inner surface of said chamber for controlling the direction of travel of said material past said second portion so that said material terminates its circular path of travel and strikes said first portion at a perpendicular angle.

3. The invention of claim 1 wherein said means for arresting comprises:
   a relatively flat inner surface along an upper portion of the inner surface of said chamber; and
   means comprising a portion of said inner surface of said chamber adjacent the lower edge of said opening for orienting the direction of travel of said material so that it strikes said flat surface at approximately a perpendicular angle.

4. The invention of claim 1 in which said shredding means comprises lengths of chains with each length having one of its ends affixed to said shaft.

5. The invention of claim 4 in which said extracting means comprises:
   a blower housing affixed to an end of said chamber and having its horizontal center axis coaxial with said shaft;
   a portion of said shaft extending into said blower housing;
   a blower in said housing fixably attached to said shaft;
   an outlet in a wall of said housing; and
   said blower being effective as said shaft rotates for causing shredded material to be extracted from said drum into said housing and forced through said outlet.

6. The invention of claim 5 in which said spreading means comprises:
   an exit elbow positioned over said fan housing outlet to receive the shredded mulch material forced out of said housing by said blower;
   a material spout affixed to said chute and comprising an outlet from which shredded material is received from said chute and propelled into the air for dispersal over the ground; and
   means for controlling the horizontal and vertical orientation of said spout as material is ejected therefrom.

7. In a spreading device having:
   a beating chamber, a blower housing, a motor, a horizontal shaft connected to a drive shaft of said motor and extending through said blower housing and said beating chamber, a blower fixably connected to said shaft in said blower housing, shredding chains connected to said shaft in said beating chamber;
   an opening in the cylindrical wall of said chamber for receiving bales of material to be mulched, said blower being effective to create an intake draft in said opening;
   means including said shredding chains for causing said received mulch material to travel in a semicircular path within said chamber about said shaft; and
   means in said chamber effective during each revolution of said material about said shaft for momentarily arresting the circular travel of said material until said material is subsequently engaged by said shredding chains.

8. The invention of claim 7 in which said last named means comprises a relatively flat inner surface along the upper portion of the inner surface of said chamber, a portion of said inner surface of said chamber adjacent the lower edge of said opening for orienting the direction of travel of said material so that after being influenced by the intake draft as it passes by said opening that it strikes said flat surface at approximately a perpendicular angle.